United States Patent [19]

Lucast et al.

[11] Patent Number: 4,526,905
[45] Date of Patent: Jul. 2, 1985

[54] POLYURETHANES FROM DIALKYL DIAMINOBENZENES AND PROCESSES THEREFOR

[75] Inventors: Donald H. Lucast, St. Paul, Minn.; Ronald L. Shubkin, Baton Rouge, La.; Allen H. Filbey, Baton Rouge, La.; John C. Wollensak, Baton Rouge, La.

[73] Assignee: Ethyl Corporation, Richmond, Va.

[21] Appl. No.: 612,965

[22] Filed: May 23, 1984

[63] Continuation-in-part of Ser. No. 395,125, Jul. 6, 1982, abandoned.

[51] Int. Cl.$^3$ .............................................. C08G 18/14
[52] U.S. Cl. ..................................... 521/51; 252/182; 264/51; 264/328.1; 264/328.6; 264/328.8; 521/159; 521/163; 528/64; 528/76; 528/83
[58] Field of Search .......................... 521/159, 163, 51; 528/64, 76, 83; 264/51, 328.1, 328.6, 328.8; 252/182; 427/385.5

[56] References Cited

U.S. PATENT DOCUMENTS

| 2,683,730 | 7/1954 | Seeger et al. |
| 3,362,979 | 1/1968 | Bentley |
| 3,428,610 | 2/1969 | Klebert |
| 4,218,543 | 8/1980 | Weber et al. |
| 4,314,962 | 2/1982 | Wollensak et al. |
| 4,420,570 | 12/1983 | Dominguez |

FOREIGN PATENT DOCUMENTS 1534258 2/1979 United Kingdom.

OTHER PUBLICATIONS

*Polyurethanes, Chemistry and Technology*, Saunders & Frisch, Interscience Publishers, 1964, pp. 116–117 & 231–233.
*Journal of Organic Chemistry*, vol. 46, Beak et al., p. 2368, (1981).

*Primary Examiner*—Maurice J. Welsh
*Attorney, Agent, or Firm*—Donald L. Johnson; John F. Sieberth; John F. Hunt

[57] ABSTRACT

Dialkyl diamines for use with polyols and polyisocyanates in cast elastomer and reaction injection molding polyurethane processes. The dialkyl diamines are prepared by nitration and reduction of dialkylbenzenes or alkylation of meta-phenylenediamine. The chain extenders have the following structure:

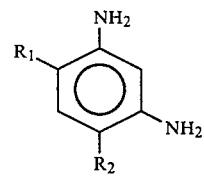

where $R_1$ is $C_1$–$C_6$ alkyl or $C_3$–$C_6$ cycloalkyl and $R_2$ is $C_2$–$C_6$ alkyl or $C_3$–$C_6$ cycloalkyl.

Contrary to the teachings of the prior art the novel diamines have surprisingly good reaction times to form polyurethanes with excellent physical properties. Furthermore, little or no mold release is required in RIM and other processes using the chain extenders of the invention.

32 Claims, No Drawings

POLYURETHANES FROM DIALKYL DIAMINOBENZENES AND PROCESSES THEREFOR

This application is a continuation-in-part of U.S. application Ser. No. 395,125 filed July 6, 1982, now abandoned.

BACKGROUND OF THE INVENTION

1. Field of the Invention

This invention relates in general to polyurethanes, chain extenders, and processes for making and using them. The process relates in particular to certain dialkyl-m-phenylenediamines. The invention is also germane to reaction injection molding (RIM), reinforced reaction injection molding (RRIM), and cast elastomer processes for making polyurethanes including the products made thereby, especially automobile parts.

II. Description of the Prior Art

It is known to prepare useful polymers from the polyaddition reaction of isocyanates with polyols and diamines. Such polymers are made as elastomers, fibers, coatings, adhesives, as well as rigid and flexible foams.

Cast elastomers are made by carrying out the polymerization in a mold, usually at elevated temperature. Products from cast elastomer processes include tires, conveyor belts, and many other articles.

Since the development of reaction injection molding (RIM) processes in West Germany and elsewhere, polymer products have been made thereby for various purposes. These products include high density, integral skin rigid foams as well as automobile fascia (bumpers), grills, and the like. The products are formed in seconds from positively controlled mixing heads or by other static impingement mixing means. A further description of the RIM process may be found in U.S. Pat. No. 4,314,962 which is incorporated herein by reference.

Furthermore, a reinforced RIM (RRIM) process has been developed wherein the injection materials have contained therein prior to reaction, reinforcing fibers, metals, or other shapes/materials to strengthen the resultant products. RRIM products offer a variety of uses not previously available with RIM products since the physical or other properties may be changed by the reinforcing members.

In the past, diethyltoluene diamines and similar aromatic amines have been used, in a relatively pure form, as chain extenders in RIM, RRIM, and cast elastomer processes. Such processes are disclosed in U.S. Pat. No. 3,428,610 and 4,218,543. Those patents and others disclose such diamines as 2,5-diaminoxylene, 2,4-diaminomesitylene, 3,5,3',5'-tetra-ethyl-4,4'-diaminodiphenylmethane, 1-methyl-3,5-diethyl-2,4-diaminobenzene, and 1,3,5-triethyl-2,4-diaminobenzene. Such chain extenders, used in pure form reliably produce products of specified characteristics in a repeatable mold time. Of course, variation of the reactant polyhydroxy or polyisocyanate will also vary the characteristics and gel/hardening times. Notably, however, the mold times are most readily regulated by the use of predetermined chain extenders.

The only notable chain extender diamine which is formed as a mixture is the mixture of 1-methyl-3,5-diethyl-2,4-diaminobenzene and 1-methyl-3,5-diethyl-2,6-diaminobenzene, commonly referred to as diethyltoluene diamine (DETDA).

There exists a need for a greater variety of chain extenders to be used with conventional polyols and isocyanate-containing compounds. New chain extenders are needed to provide a spectrum of gelation and firm times as well as to create polyurethanes containing different structures which impart desirable mechanical, electrical, or other properties.

There also exists a need for very fast reacting chain extenders. Fast extenders can be used with rapidly operating RIM equipment which increases production rates for polyurethane molded products.

There also exists a need for reduction in the cost of RIM processing and a need to reduce or eliminate the use of external mold release agents.

SUMMARY OF THE INVENTION

Applicants have now discovered the use of certain dialkyl-m-phenylenediamines as chain extenders despite contrary teachings of the prior art. The present invention is directed to the provision of a variety of chain extenders for processes to produce polyurethanes. The present invention is also directed to the provision of a variety of chain extenders to produce polyurethanes having valuable physical properties such as tensile strength, abrasive resistance, and the like. The present invention is also directed to the provision of very fast reacting chain extenders for high speed of RIM and RRIM processes. The invention is also directed to reactive internal mold release agents.

Another aspect of the invention is directed to the provision of chain extenders for various cast elastomer process techniques and products. The present invention is also directed to the provision of appropriate chain extenders for cast elastomer processes where time is needed to apply vacuum so as to withdraw any air or other gases formed.

This invention embodies RIM, RRIM, and cast elastomer processes for making polyurethanes from certain chain extenders, polyurethanes per se made from the chain extenders; as well as articles made therefrom. Such articles include automotive parts such as bumpers, fascia, fenders, panels, and the like. The articles may be purely polyurethane or reinforced with fiberglass, fibers, metal, etc. Finally, the invention also includes compositions of the various mixtures of a chain extender of the invention with other urethane-forming substances used in the formation of polyurethane polymers of the invention. Such mixtures include, for example, a mixture stream prepared for injection into a mold for a RIM process.

The present invention comprises a polyurethane made from an organic polyisocyanate, an organic polyol, and a reactive internal mold release agent.

This invention comprises a polyurethane formed from an organic polyol, an organic polyisocyanate, and a chain extender having the structure:

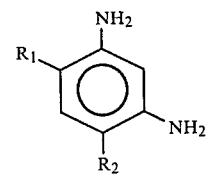

wherein $R_1$ is $C_1$–$C_6$ alkyl or $C_3$–$C_6$ cycloalkyl and $R_2$ is $C_2$–$C_6$ alkyl or $C_3$–$C_6$ cycloalkyl. The extender also acts as a reactive internal mold release agent.

A preferred class of compounds are those where at least one of $R_1$ and $R_2$ is a larger group or has a secondary/tertiary carbon atom contained therein. Also preferred are those compounds where at least one alkyl group has an α-carbon (i.e., the carbon linked to the aromatic nucleus) which is secondary or tertiary such as in an isopropyl or tert-butyl group. More preferred are those compounds where both $R_1$ and $R_2$ are large groups and/or have secondary/tertiary carbon atoms (preferably adjacent to the aromatic nucleus). Still more preferred are those compounds where the alkyl groups are both as described above and are identical since they may be readily synthesized from available materials and provide polyurethanes with excellent properties. The most preferred chain extender/reactive internal mold release agent of this invention is 4,6-diisopropyl-m-phenylenediamine

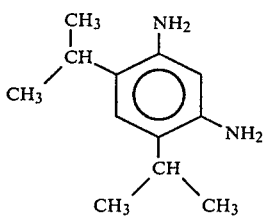

This agent provides polyurethanes with physical properties comparable or superior to those similarly made from the commercial chain extender diethyltoluene diamine (DETDA). Furthermore, polyurethanes made by the RIM process with 4,6-diisopropyl-m-phenylenediamine require no mold release agents. That is, such RIM polyurethane molded articles are readily successively prepared and demolded without the use of mold release agents now used in the art.

Furthermore, a polyurethane may be prepared using the reactive internal mold release agent of the invention with another chain extender. The physical properties of the product may be regulated by balancing the percentage of other chain extender and still provide good mold release characteristics. In a preferred embodiment using a commercial resin/isocyanate formulation, about 5-50 percent, more preferably 10-30 percent, by chemical equivalent of the reactive internal mold release agent is substituted for a conventional chain extender.

The invention also comprises an active hydrogen-containing blend for use in the production of polyurethane moldings, said blend comprising:

(a) an organic polyol of molecular weight 400-7,000, and (b) a chain extender miscible with said polyol and having the structure:

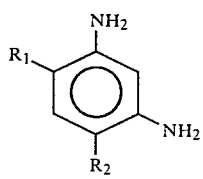

The invention also comprises a process for preparing a RIM polyurethane molded product, said process comprising the steps of:

(a) at a temperature in the range of about 15°-100° C. subjecting to static impingement mixing two liquid streams, the first stream comprising (i) an organic polyol in the molecular weight range 400-7,000, and (ii) a 4,6-dialkyl-m-phenylenediamine chain extender of structure:

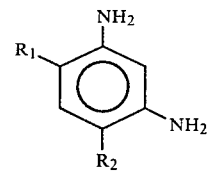

wherein $R_1$ is $C_1$–$C_6$ alkyl or $C_3$–$C_6$ cycloalkyl and $R_2$ is $C_2$–$C_6$ alkyl or $C_3$–$C_6$ cycloalkyl and the second stream comprising (iii) an organic polyisocyanate, or prepolymer or quasi-prepolymer formed from an organic polyisocyanate and an organic polyol, a catalyst being present in said first stream or said second stream, whereby a liquid mixture is produced;

(b) subsequently injecting a shot of said liquid mixture into a closed mold preheated to a temperature in the range about 15°-100° C.;

(c) opening the mold and removing the formed polyurethane molded product; and (d) optionally subjecting said molded product to a post-cure at a temperature in the range about 50°-150° C., said process being conducted such that the amount of chain extender is about 5-30 weight percent of the total weight of components (i)-(iii).

The invention also comprises a polyurethane elastomer prepared by reacting:

(a) one equivalent of an intermediate containing about 0.5-15.0 percent free —NCO groups prepared by reacting an organic polyisocyanate with an organic compound having at least two active hydrogen atoms as determined by the Zerewitinoff test with (b) about 0.5-1.2 equivalents of a 4,6-dialkyl-m-phenylenediamine chain extender of structure:

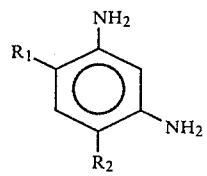

where $R_1$ is $C_1$–$C_6$ alkyl or $C_3$–$C_6$ cycloalkyl and $R_2$ is $C_2$–$C_6$ alkyl or $C_3$–$C_6$ cycloalkyl.

The chain extender technology of the prior art demanded certain structural requirements in order to maintain reactivity and provide desirable physical properties in polyurethanes made with extenders. Severe hindrance of one or both reactive sites of a chain extender has always been taught as a requirement. However, Applicants have found that, surprisingly, less hindered reactive sites on a chain extender as set forth above are suitable for making chain extenders by the RIM and cast elastomer processes. In addition some of the chain extenders according to the invention provide a better match for the most advanced processing equipment and provide polyurethanes which are in some aspects superior to the current art-recognized best extenders, such as diethyltoluene diamine (DETDA).

The art, in U.S. Pat. No. 4,218,543 for RIM and U.S. Pat. No. 3,428,610 for cast elastomers, for example, has required that at least one reactive site be completely hindered by alkyl or other groups in both positions ortho to the reactive site. Applicants have found that single ring aromatic diamine chain extenders with only one sterically hindering alkyl or cycloalkyl group adjacent (ortho) to each reactive site, contrary to the teachings of the art, may be used in cast elastomer and RIM processes to provide polyurethanes with excellent properties. This result is completely unexpected.

The diamines of the invention may be used as chain extenders in formulations for spray coating steel or other substrates with a foam or elastomeric polyurethane coating. The diamines are usable with or without a solvent in any conventional spray coating apparatus or method. Both internal and external mixing apparatus are suitable so long as polyurethane components are suitably admixed to form a polyurethane coating. U.S. Pat. No. 4,267,299 describes solvent and solventless techniques for the use of such materials and is incorporated herein by reference in its entirety.

Volume XVI of the High Polymers series is *Polyurethanes, Chemistry and Technology* by Saunders and Frisch, Interscience Publishers, 1964. That volume at Pages 116–117 and 231–233 discusses and illustrates spray coating apparatus suitable for this invention and same is also hereby incorporated by reference.

The more preferred group of chain extenders of the invention are 4,6-diisopropyl-m-phenylenediamine; 4,6-di-tert-butyl-m-phenylenediamine; 4,6-diethyl-m-phenylenediamine; 4,6-di-sec-butyl-m-phenylenediamine; and 4-isopropyl-6-methyl-m-phenylenediamine. The 4,6-diisopropyl-m-phenylenediamine is most preferred because it provides polyurethanes with excellent physical properties.

An unexpected and beneficial result is that the use of the chain extenders/reactive internal mold release agent of the invention obviates or reduces the use of external mold release agents, especially in RIM.

This aspect of the invention is especially advantageous for increasing the production rate of RIM equipment. Furthermore, the cost of producing a RIM article is reduced when a mold release agent is not required.

Some extenders of the invention result in RIM articles which require more mold release agent than others while some extenders produce articles requiring little or no mold release agent applied to the mold. In still other RIM molded articles, application of mold release agent may be desirable after about ten moldings.

DESCRIPTION OF THE PREFERRED EMBODIMENTS

This invention pertains to improved polyurethane systems, more particularly in one aspect it pertains to polyurethane systems for reaction injection molding (RIM). Reaction injection molding is a rapid, typically one-step process for producing essentially integral skin, elastomeric parts. RIM is a relatively new process rapidly taking its place alongside more established plastic processes. It was developed to compete with injection molding of thermoplastic urethane and rubber for large, thin fascia for the front and rear ends of automobiles. The earliest development was in Europe where it is widely used today in the production of furniture, cabinets, and building components.

The process requires liquid components which can be catalyzed to produce rapid polymerization at low temperatures.

The process comprises separate feeding of polyol and isocyanate under very precise control with high-pressure metering pumps into a mixing head where the liquid streams are mixed under very high velocity and then injected into a closed mold. An alternative method utilizes piston displacement of the liquids at controlled rates to meter the reactants into the mixing head.

Typically, the mixing head is self-cleaning and mounted on the mold. It contains a relatively small, usually cylindrical, mixing chamber of the static impingement type where the liquid streams are mixed. The head usually has a valving mechanism that directs into the mixing chamber where the "shot" is made. The head usually has a piston to clean the mixing chamber and seal the mold after the shot is completed.

A more recent development is reinforced RIM, which is designated "RRIM." In this technology, RIM plastics are reinforced with a filler such as milled glass, wollastonite or other mineral fillers. These materials reduce the coefficient of thermal expansion and give a product also having a higher flexural modulus. This technology offers promise as a means of providing large exterior body parts such as fenders, which can be matched to steel.

The dialkyl diamine chain extenders of the invention can be used in several of various conventional RIM and cast elastomer processes such as those disclosed in U.S. Pat. No. 4,218,543 and U.S. Pat. No. 3,428,610, respectively, which are incorporated herein by reference in their entirety.

The 4,4'-methylenebis(phenylisocyanate) (MDI) is a preferred diisocyanate for preparing RIM polyurethanes according to this invention. Some commercial preparations of this compound have a minor amount of trinuclear components; however, these commercial materials can be used in this invention. This invention also includes polyurethanes derived from other polyisocyanates such as the following substances and mixtures thereof; m-phenylenediisocyanate; 2,4-toluenediisocyanate; 2,6-toluenediisocyanate; naphthalene-1,5-diisocyanate; 1,3,5-benzenetriisocyanate; and polyarylpolyalkylenepolyisocyanates such as a polymethylenepolyphenylisocyanate. Isocyanates prepared by the phosgenation of the reaction product between aniline and formaldehyde having a functionality of 2.2 to about 3.5 are described in U.S. Pat. Nos. 2,683,730 and 3,362,979. Additional applicable isocyanates are mentioned on pages 4–5 of British Pat. No. 1,534,258 and that disclosure of useful isocyanates from page 4, line 24, to page 5, line 10, is incorporated by reference herein as if fully set forth.

RIM polyurethanes of this invention are preferably made from polyether diols. More preferably, these polyether diol compounds predominately have two hydroxy groups bonded to primary carbon atoms. Typically, in such more preferred materials up to about 90 percent of hydroxy groups present are primary. Polyether polyols suitable for use in this invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and/or a higher oxide and then reacting the intermediate thereby produced with ethylene oxide.

The organic compounds used as polyhydroxy reactants in this invention are dihydroxy polyalkylene polyethers having at least two primary hydroxyl groups and a molecular weight of from about 400 to about 12,000, more preferably from about 400 to about 7,000 or 5,000. Typically, such polyethers are made by polymerization of ethylene oxide, propylene oxide,, butylene oxide, tetrahydrofuran, or the like. The materials may be polymerized alone, or as mixtures, or in a successive addition.

Various catalysts are usable according to the invention. The catalysts such as dibutyl tin dilaurate are preferred. U.S. Pat. No. 4,218,543 discloses a broad variety of catalysts and is incorporated herein by reference in its entirety.

Polyurethanes produced by the above-described reactants are extended, i.e., chain-lengthened, by the dialkyl diamines of the invention. The amine groups react with the isocyanate(s) used in the processes of the invention. Furthermore, the diamines of the invention are substantially free of groups which react with the isocyanate(s) to terminate polyurethane chain formation.

The chain extenders of the present invention surprisingly also act as a reactive internal mold release agent. That is, the invention includes compounds reacting with the isocyanates and also providing good release from the mold in which they are used. This is especially important in RIM and the 4,6-disubstituted-m-phenylenediamines wherein at least one substituent is $C_2$–$C_6$ alkyl or $C_3$–$C_6$ cycloalkyl form a preferred class of compounds. More preferably both substituents are $C_2$–$C_6$ alkyl.

The chain extenders/agents of the invention are either liquid at room temperature or are soluble/dispersable in the polyols used in the RIM process.

The following compounds are suitable as chain extenders of the invention:
4,6diisopropyl-m-phenylenediamine;
4,6-di-tert-butyl-m-phenylenediamine;
4,6-diethyl-m-phenylenediamine;
4-isopropyl-6-methyl-m-phenylenediamine;
4-isopropyl-6-tert-butyl-m-phenylenediamine;
4-ethyl-6-isopropyl-m-phenylenediamine;
4-methyl-6-tert-butyl-m-phenylenediamine;
4,6-di-sec-butyl-m-phenylenediamine;
4-ethyl-6-tert-butyl-m-phenylenediamine;
4-ethyl-6-sec-butyl-m-phenylenediamine;
4-ethyl-6-isobutyl-m-phenylenediamine;
4-isopropyl-6-isobutyl-m-phenylenediamine;
4-isopropyl-6-sec-butyl-m-phenylenediamine;
4-tert-butyl-6-isobutyl-m-phenylenediamine;
4-cyclopentyl-6-ethyl-m-phenylenediamine;
4-cyclohexyl-6-isopropyl-m-phenylenediamine;
4,6-dicyclopentyl-m-phenylenediamine; etc.

In another aspect, this invention also pertains to urethane cast elastomers. These elastomers are made by pouring a reaction mixture into a mold where they are allowed to cure. Production can be carried out by the one-shot or by the prepolymer method, the latter being preferred. In this method a polyol of say, 1,000 to 3,000 m.w. and of the polyester or polyether type, is reacted with a stoichiometric excess of diisocyanate to produce a prepolymer. Chain extension is then carried out with a chain extender/reactive internal mold release agent of the invention. Some of the factors which have a bearing on the final properties are molecular structure, chain entanglement, and secondary bonding forces such as hydrogen bonding and van der Waals forces. These are controlled by selection of the molecular components employed, as well known in the art. For example, typically each backbone exhibits its own advantages and disadvantages; e.g. polyether types display better resilience, lower heat buildup, better hydrolytic stability, good low temperature properties, and low processing viscosity. The polyesters, however, are tough, abrasion-resistant elastomers with better oil resistance and can be produced at lower cost. It should be noted that these comparisons are made with urethanes having the same hardness.

The most common technique for producing high-quality castings is by use of an automatic dispensing machine. The machine degasses the prepolymer either in a batch or continuous mode and meters it along with the chain extender in controlled proportions to a mixhead. Here the components are mixed thoroughly, then discharged into a mold. A significant advantage in liquid casting is that less capital expense is required for processing equipment as compared to that needed for the thermoplastic or millable gum elastomers.

Urethane cast elastomers of the type known in the art have a hardness range of approximately 10 Shore A to 80 Shore D. These polymers are tough, abrasion resistant, with good mechanical strength and oxidation resistance. They are used in solid tires, grain chute liners, conveyor belts, gears, seals, and in many industrial parts.

As apparent from the description herein, this invention pertains to an improvement in the field of polyurethane chemistry. As well known, these polyurethanes as well as those made by the RIM process arise from the reaction of a polyol with a polyisocyanate.

For the cast elastomers of this invention, after or during reaction of the polyisocyanate and polyol, the chain length is extended via the dialkyl-m-phenylenediamine of the invention. In addition to the polyol, polyisocyanate, and chain extender of this invention, cast elastomer compositions of this invention may also include other materials such as catalysts, blowing agents, and materials commonly employed in making polyurethane cast elastomers, RIM, or RRIM materials.

Of course the diamine of the invention must be suitable for the timing required in molding by the various techniques discussed above. Some extenders of this invention are even faster than art-known extenders and as such will be suitable for the fastest RIM mixing equipment available and in development.

Both polyalkylene ether glycol and polyester glycols can be used in forming the prepolymer and finished compositions of this invention.

Generally, the polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Polyalkylene ether glycols suitable for the preparation of polyurethane prepolymers should have a molecular weight of at least 500, although it can be as high as 10,000. Molecular weights of about 750 to 3,000 are preferred. Optionally, glycols having molecular weights of less than about 350 can be added to the high molecular weight polyols. These low molecular weight glycols can be used in proportions of about 0.5–3.0 moles per mole of polyether glycol, but the exact proportions are determined by the desired physical properties of the final products.

Representative glycols include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, and the like. Mixtures of these, as well as the alcohols described below, can be employed.

For polyester polyols, they can be based on polyester glycols, such as poly(ethyleneadipate), poly(ethylene-propylene adipate), poly(ethylene glutarate), and poly(ethylene pimelate). Polyester glycols suitable for the preparation of polyurethanes can be made by several alternate routes, such as: condensation of a dicarboxylic acid with an excess of a diol, transesterification of a dicarboxylic acid ester of a lower alcohol with a diol, or reaction of dicarboxylic acid dichloride with diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for making polyurethane prepolymers. Generally, the above described polyester glycols should have a molecular weight of 400–7,000, a molecular weight of 750–3,000 being preferred.

Because of their greater reactivity, aromatic diisocyanates are preferred but aliphatic or araliphatic diisocyanates also can be used. Representative isocyanates include toluene-2,4-diisocyanate, toluene-2,6-diisocyanate, benzene-1,3-diisocyanate, naphthalene-1,5-diisocyanate, methylenebis(4-phenylisocyanate), 4,4'-biphenylenediisocyanate, hexamethylenediisocyanate, 1,4-cyclohexanediisocyanate, and methylenebis(4-cyclohexaneisocyanate) and the other isocyanates mentioned above. Mixtures of two or more diisocyanates may be employed. The addition of minor amounts of aliphatic or cycloaliphatic diisocyanates to prepolymers based on aromatic diisocyanates is useful for increasing the hardness of cured products without decreasing the pot life.

In order to carry out the process of preparing a cast elastomer according to this invention, a reaction product comprising free isocyanate groups is made by reacting a diol, of the type described above, or a mixture thereof, with a stoichiometric excess of diisocyanate component. In some instances, a large excess can be added to the reaction zone and subsequently some of the excess removed by a distillation or flash under reduced pressure. Alternatively, the desired excess can be added to the reaction zone. In either mode, the initial process step yields a pre-product which has not yet been extended by the chain extender(s) provided by this invention.

The amount of diisocyanate which is used is generally from about 1.01 to 2 moles per mole of polyol. This prepares a prepolymer which can then be reacted with the diamine which acts as a "curing agent" in this cast-elastomer embodiment. It may be desirable to admix the curing agent and the prepolymer after the prepolymer has been heated to a temperature to reduce the viscosity of the prepolymer. This temperature is usually above about 70° C. However, the temperature should not be so high as to exceed the point at which the prepolymer or any material admixed therewith undergoes an undesirable amount of thermal decomposition. Generally this can be avoided by keeping the temperature below about 100° C.

Prepolymers and quasi-prepolymers are used in the cast elastomer and RIM processes of the invention. There are a prereacted mixture of at least a portion of the polyol reactant with the polyisocyanate reactant. The extent of prepolymer reaction is usually measured by the remaining amount of free NCO (isocyanate) groups. The quasi-prepolymers are often used in RIM and are usually a mixture of a relatively short chain diol or triol (polyol) with MDI, e.g. tripropylene glycol and MDI. "Pure" MDI has about 33–34% free NCO groups; an example is Upjohn's Isonate ™ 125M MDI reactant. Typical quasi-prepolymers have less, e.g., 22% free NCO groups. Mobay's Modur ™ PF quasi-prepolymer is an example of a quasi-prepolymer. Upjohn's Isonate ™ 181 has about 29.3% free NCO groups after prereacting MDI with a polycarbodiimide.

Prepolymers are used mostly for cast elastomer processes, are generally made with 1000–2000 molecular weight polyols, and have 2–10%, preferably 3–6% free NCO groups. That is, relatively long chain polyether polyols are prereacted with isocyanate. For RIM, a polyol of about 5000 molecular weight is used so as to result in a prepolymer of higher free NCO content, e.g. 15%.

The dialkyl diamines suitable as chain extender/reactive internal mold release agents according to the present invention have the structure:

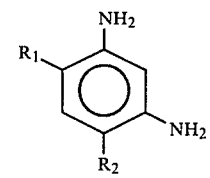

where $R_1$ is $C_1$–$C_6$ alkyl or $C_3$–$C_6$ cycloalkyl and $R_2$ is $C_2$–$C_6$ alkyl or $C_3$–$C_6$ cycloalkyl.

The alkyl functions of the invention include not only methyl, ethyl, n-propyl, isopropyl, n-butyl, sec-butyl, isobutyl, and tert-butyl, but also the numerous pentyl and hexyl alkyls as well as the cyclic $C_3$–$C_6$ cycloalkyls such as cyclopentyl and cyclohexyl. Exemplary alkyl and cycloalkyl radicals include lthe following:

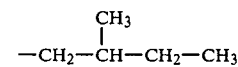

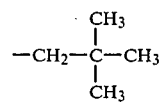

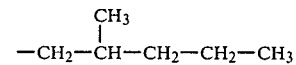

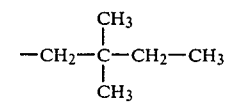

-continued

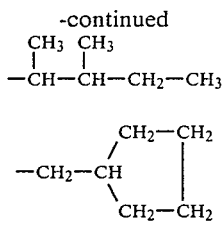

It should also be noted that many of the substituents of this class of compounds have a variety of positional isomers and stereoisomers associated with the substituents. When more than one R of the diamine contains one or more asymmetric carbon atoms a number of diastereomers exist dependent upon the number of asymmetric carbon atoms. Additionally, the diamine chain extenders may be mixtures of compounds or mixtures of isomers, stereo or positional.

Production of the compounds of the invention may result in small portions of by-product which are outside the defined structure. This however, has not been found to adversely affect the reaction times associated with the extender.

The following examples serve to clearly set forth the best mode of the invention of which we are now aware.

EXAMPLE 1

(Preparation of 4,6-diisopropyl-m-phenylenediamine)

About 16.2 g. (0.1 mole) of m-diisopropylbenzene, 35 ml. methylene chloride, and 50 ml. sulfuric acid were charged into a 300 ml., three-neck, round bottom fluted flask fitted with thermometer, mechanical stirrer, addition funnel, and cooling bath. The mixture was vigorously stirred while 19 ml. (0.3 mole) 71% nitric acid was added dropwise.

The reaction mass was poured into ice water. The organic layer was separated, washed with dilute NaOH, water-washed, and dried. The solvent was stripped off to yield 24.4 grams product at 96.7% purity with an isomer ratio 82:16 (4,6-:2,4-) by gas chromatography analysis. The product was recrystallized from 60% isopropanol–40% water to yield 21.9 grams product (86.8% of theory) with an isomer ratio of 95:5 and melting point 62°–66° C. The structures were confirmed by infrared and nuclear magnetic resonance spectroscopy.

The dinitro product above was partially dissolved in 200 ml. absolute ethanol and charged to a Parr shaker bottle along with 0.5 gram 5% palladium/carbon catalyst. The bottle and contents were shaken under 40 psig of hydrogen for about 3 hours as the exotherm raised the temperature to about 45° C. The catalyst was filtered and the solvent stripped, yielding 14.8 grams of product. The orange oil product solidified on standing. Analysis by gas chromatography shows 100% purity and the structure identification was supported by infrared and nuclear magnetic resonance spectroscopy.

EXAMPLE 1A

The same procedure was followed as for Example 1 except the reaction materials were increased threefold to yield 46.8 grams (0.186 mole) dinitro product of 100% purity by gas chromatography (64.8% of theory). The reduction was carried out for four days at 45 psig hydrogen to provide 15.4 grams (0.080 mole) pale yellow solid product (43.0% of theory) when recrystallized from ligroin. The melting point was 72.5°–73.5° C. which is confirmed in the literature.

EXAMPLE 2

(Preparation of 4,6-diisopropyl-m-phenylenediamine)

The procedure of Example 1 was generally followed for this Example. About 500 grams (3.08) moles) m-diisopropylbenzene (first batch) were mixed with 750 ml. methylene chloride and 1,400 ml. 97% sulfuric acid in a five-liter, three-neck, round bottom flask fitted with thermometer, mechanical stirrer, addition funnel, and ice bath.

About 500 ml. 71% nitric acid was added dropwise over four and one-half hours while maintaining the temperature at about 32° C. The reactants were stirred an additional one-half hour at 30° C. and the layers were separated.

The organic phase was washed with two 500 ml. portions water, 600 ml. dilute aqueous $Na_2CO_3$, and a third 500 ml. portion of water before drying. The solution was concentrated to a red paste which was crystallized from a 2:1 portion of isopropanol/water.

A second batch was similarly prepared from 400 grams (2.47 moles) m-diisopropylbenzene. The combined crystallized batches were recrystallized from a 3:1 portion of isopropanol/water yielding 788 grams (3.13 moles) of 1,3-diisopropyl-4,6-dinitrobenzene (56.4% yield). The structure was confirmed by infrared and nuclear magnetic resonance spectra.

The dinitro product, 788 grams, was charged along with three liters isopropanol and 5.0 grams Raney nickel to a two-gallon autoclave. The sealed autoclave was pressurized to 1,200 psig with hydrogen and heated. An exothermic reaction began at 85° C. and the temperature rose to 155° C. before cooling was applied to maintain 100° C. The reduction was complete in one hour. The reaction mass was stirred and cooled overnight before filtering the catalyst and stripping the solvent. About 335 grams of crystals were derived as a first crop from the dark pasty product in ligroin. A second crop of 97.8 grams was obtained. The first crop had a melting point of 71.5°–72.5° C. Gas chromatography verifies the purity.

EXAMPLE 3

(Preparation of 4,6-diisopropyl-m-phenylenediamine)

With cooling 280 ml. 71% nitric acid was added to 1,000 ml. 96% sulfuric acid. About 500 ml. methylene chloride and 324.6 grams (2.0 moles) m-diisopropylbenzene were combined in a three-liter, three-neck, round bottom flask equipped with mechanical stirrer, addition funnel, thermometer, and water bath. The mixed acid solution was added dropwise over 70–75 minutes at 25°–35° C. controlled temperature. The stirring was continued one hour longer before separating the organic layer. A second, identical reaction was repeated and the two organic portions were combined and washed with one liter of water, one liter 5% $Na_2CO_3$, and 500 ml. 1% HCl. The organic product was dried and the solvent was distilled at atmospheric pressure before vacuum stripping the final small amount. The product was crystallized from a 1,300 ml. portion of 3:1 isopropanol/water and 160 ml. isopropanol. Concentration and cooling of the mother liquor did not provide a second crystal crop. The crystals were vacuum dried at 50° C. and 25 mm Hg to yield 828.6 grams (3.28 moles)

of 1,3-diisopropyl-4,6-dinitrobenzene (82.1% of theory) with a melting point 64°-67° C.

The spent acid was 13.4% water (by titration), 82.85% sulfuric acid (by titration), and 1.0% nitric acid (by acid difference).

The dinitro product was reduced in eleven batches. The typical batch was 75.0 grams (0.297 mole) dinitrodiisopropylbenzene, 150 ml. isopropanol, and 1.0 gram Raney nickel catalyst in a 300 ml. stainless steel autoclave. The autoclave was flushed with nitrogen and hydrogen before pressurizing to 1,000 psig hydrogen and heating. Gas uptake began at about 55°-60° C. and heating was discontinued at 75° C. as gas uptake became very rapid. Cooling water and hydrogen were controlled to maintain the temperature at 100°-110° C. and each reduction took only about ten minutes. The combined products were filtered through Celite, stripped of solvent, and crystallized from 500 ml. ligroin. The product yield was 364.0 grams 4,6-diisopropyl-m-phenylenediamine with a melting point of 71°-73° C. A second crop of 118 grams (total 482 grams, 2.51 moles) was obtained by concentrating and cooling the mother liquor (76.9% of theory). The overall yield based on m-diisopropylbenzene was 62.8%.

EXAMPLE 4

(Preparation of 4,6-di-tert-butyl-m-phenylenediamine)

About 34.24 grams 94% pure m-di-tert-butylbenzene was obtained by isomerizing 207.9 grams p-di-tert-butylbenzene with 15 grams AlCl$_3$ catalyst and fractionating the hydrocarbon mixture through a Nestor-Faust adiabatic spinning band column.

Approximately 40 ml. 70% nitric acid and 90 ml. 96% sulfuric acid were mixed with cooling and added to a solution of the 34.24 grams (0.18 mole) m-di-tert-butylbenzene in 75 ml. methylene chloride in a 500 ml. three-neck fluted flask at 45°-47° C. The reaction mass was stirred 45 minutes and the organic layer was separated, washed with water, dilute Na$_2$CO$_3$, more water, and dried. Solvent removal provided 38.5 grams (0.137 mole) of pale yellow solid (76.1% of theory).

The 38.5 grams dinitro product were charged to a 300 ml. autoclave along with 1.0 gram Raney nickel and 75 ml. isopropanol. The autoclave was flushed with nitrogen and then hydrogen before pressurizing to 1,200 psig with hydrogen and heating. Despite cooling, gas uptake was rapid and the exotherm raised the temperature to 172° C. The reaction was complete in six minutes. The discharged product was filtered through Celite and the solvent was stripped yielding 29.0 grams (0.132 mole) of crude product (96% of theory). Crystallization from ligroin provided 22.7 grams (0.101 mole) of 4,6-di-tert-butyl-m-phenylenediamine with structure supported by infrared and nuclear magnetic resonance spectra. The yield was 76.3% of theory and the product had a melting point of 153°-154° C.

EXAMPLE 5

(Preparation of 4,6-diisopropyl-m-phenylenediamine)

The same general procedure as above was followed with two separate 50.0 gram samples of diisopropylbenzene, nitrating at about 32° C. with nitric acid in sulfuric acid and methylene chloride solvent. These two runs provided 73.6 grams and 72.5 grams 4,6-dinitro-m-diisopropylbenzene upon distillation of the solvent. They were not recrystallized.

The dinitro product was reduced as in the previous examples to provide 106.33 grams (0.552 mole) 4,6-diisopropyl-m-phenylenediamine (95.5% of theory).

EXAMPLE 6

(Preparation of 4,6-diisopropyl-m-phenylenediamine)

A 100 gram sample of diisopropylbenzene was slowly added to 300 ml. 90% nitric acid at 15° C. The ingredients were stirred for one hour. The reaction temperature was controlled with an ice bath. The reaction mixture was then warmed to 25° C. for 15 minutes and poured into 1,200 ml. cold water. The organic solid was filtered and water-washed to yield the dinitro intermediate. The intermediate was reduced with hydrogen at 100° C. and 1,000 psig in a 600 ml. autoclave with Harshaw NI-0104 P (60% nickel on kieselguhr) catalyst. The yield was 95 grams (0.494 mole) dark semicrystalline solid (92.7% of theory).

EXAMPLE 7

(Preparation of 4,6-diethyl-m-phenylenediamine)

A solution of 254 g of a mixture of 1,3-diethyldinitro benzenes (4,6- and 2,4-) in 500 ml methanol was mixed with 5.0 g of 5% palladium on carbon catalyst and heated at 50° C. under 1000 psi hydrogen for 12 hours. The reaction mixture was filtered and the solvent was distilled off. The residue was distilled giving an oil which partially crystallized on standing. The crystals were filtered, washed with pentane and recrystallized from petroleum ether, giving 110 g of 4,6-diethyl-m-phenylenediamine (m.p. 49°-51° C.).

EXAMPLE 8

The following procedure was used to prepare polyurethane and observe comparative chain extender rates and characteristics.

Various dialkyl diamines of the invention were reacted with other components in the following amounts:
Jefferson 6503 polyol: 12.5 grams
Upjohn's Isonate 143L MDI: 5.3 grams
Dibutyl tin dilaurate catalyst: 1 drop
Chain extender: 0.015 molar equivalents The chain extender, if solid, is mixed with the polyol in a beaker and placed in an air circulated oven at 150° C. until a homogeneous mixture is obtained. The mixture is cooled to room temperature in a nitrogen bag.

A drop of catalyst is added to the cooled mixture. A timer is started as the MDI is quickly added and hand stirring of the ingredients is accomplished with a small spatula. The following times were noted and recorded as reflected in Table 1:

Gelation Time—a thickening of the reaction mixture is noticeable;

Tack-Free Time—the surface of the mixture will not stick to an object;

Firm Time—the reaction mass will not yield under manual pressure.

TABLE 1

| Chain Extender | Molecular Weight | Reaction Times (seconds) | | | Remarks |
| --- | --- | --- | --- | --- | --- |
| | | Gelation | Tack-Free | Firm | |
| Example 1 | 192 | 4 | 5 | 11 | (1) |
| Example 1A | 192 | 4 | 6 | 9 | (2) |
| Example 2 | 192 | 4 | 5 | 8 | — |
| Example 4 | 220 | 30 | 40 | 60 | (3) |
| Example 5 | 192 | 4 | 6 | 7 | — |
| Example 6 | 192 | 4 | 5 | 7 | — |

TABLE 1-continued

| Chain Extender | Molecular Weight | Reaction Times (seconds) | | | Remarks |
|---|---|---|---|---|---|
| | | Gelation | Tack-Free | Firm | |
| Example 7 | 162 | 3 | 5 | 7 | — |
| 2,4-diamino-5-isopropyl toluene | 164 | 4 | 5 | 6 | (4) |

(1) Cheesy consistency
(2) Hard polymer
(3) Low solubility in polyol and cheesy consistency but hard in 12 hours.
(4) Good consistency and hard

EXAMPLE 9

In the following examples of the RIM process of this invention, a commercial polyol is admixed with the diamine chain extender of the invention and a small portion of dibutyl tin laureate to form a resin in a recirculating system that provides one stream to the mixing head of the RIM equipment.

This resin is recirculated with heating as required to bring the viscosity of the resin to an appropriate level for mixing with polyisocyanate in the mixing head by the static impingement mixing method. The commercial MDI-type isocyanate is used in such proportion that the reactive isocyanate sites thereon are present in slight excess of the total of reactive sites on the polyol and the polyamine chain extender mixture. The recirculation temperature was about 45° C.

A resin was prepared from the diamine chain extender formed in Example 3 (a yellow-brown granular solid) and Mobay Chemical Company's Multranol TM 3901 polyol. The diamine was readily soluble at 19.1 weight percent in the polyol to provide the same number of chemical equivalents as a commercial formulation with diethyl toluene diamine (DETDA) chain extender. The resin was reacted with Mobay Chemical Company's Mondur PF MDI and M and T's T-12 dibutyl tin dilaurate catalyst in a Martin-Sweets Company mini-RIM machine. The mixhead temperature was 90°–95° F. to provide a workable viscosity. The shot time was 1.2 seconds, and the mold temperature was 120° C. The reaction proceeded rapidly. The gel time was only about 1.6 seconds as opposed to 2.0 seconds with DETDA chain extenders. The post cure was at 250° F. No external mold release was applied prior to the first shot. The first plaque was left in the mold for more than 30 minutes due to an interruption and thus, demolding was difficult. The second plaque was somewhat difficult to demold but the next eight plaques demolded quite readily. Surprisingly, no mold release was required to free the plaque, an advantageous property. Several three-inch by eight-inch plaques were tested for physical properties and physical property data was obtained as shown in Table 2.

The mold size was reduced from 8 inches square to three inches by eight inches to facilitate filling the mold with the rapid gel time of the new reactive internal mold release agent.

It is noted that in one run of a similar but high modulus formulation using the new reactive internal mold release agent, an initial application of external mold release agent was required to facilitate initial demolding. The external mold release RIM-7 was used.

TABLE 2

Physical properties Using 4,6-diisopropyl-m-phenylenediamine In (25,000) Modulus Formulation (19.1 wt. %)

| | Resin/Isocyanate Weight Ratio | | |
|---|---|---|---|
| | 2.39 | 2.18 | 2.09 |
| Isocyanate equivalent | 0.95 | 1.04 | 1.08 |
| Specific gravity | 1.093 | 1.044 | 1.100 |
| Shore D hardness | 46 | 51 | 51 |
| Flexural Modulus (thousands) at + 75° F. psi | 20.2 | 27.1 | 32 |
| Heat Sag. 1 hr. at 250° F. (121° C.), in. | .245 | .182 | .208 |
| Coefficient of Linear Expansion −40° C.→+20° C. in/in × $10^5$/°C. | 15.1 | 13.5 | 13.4 |
| Ultimate Tensile Strength, psi | 1,290 | 2,350 | 2,780 |
| Tensile Modulus (100% elongation), psi | 949 | 1,240 | 1,430 |
| Elongation at break (percent) | 360 | 395 | 363 |
| Die "C" tear, pli | 310 | 402 | 410 |

COMPARATIVE EXAMPLE 9A

The mini-RIM machine of Example 9 was operated using a low modulus formulation with the commercial chain extender (a mixture of about 75% 2,4-diamino-3,5-diethyltoluene and about 25% 2,6-diamino-3,5-diethyltoluene).

A normal spray coat of RIM-7 external mold release agent was applied to the mold prior to the first injection. The first eight inch square plaque demolded easily. Demold of the second and third plaques was not as easy as the first but generally acceptable. Demold of plaques 4–7 was fair. Plaques 8–11 showed a tacky adhesion to the mold which had been held at about 120° F. The mold temperature was increased to 135° F. and demold of plaque 12 was somewhat easier. Nevertheless plaques 13–15 were tacky and difficult to demold with high adhesion.

In a subsequent low modulus run using DETDA alone, similar results were obtained even though the external mold release agent was applied prior to the first injection.

The physical properties of a typical plaques in the mini-RIM are given in Comparative Table 3. The values in Table 3 are in close agreement with such a formulation in commercial equipment.

COMPARATIVE TABLE 3

Physical properties Using DETDA In 25,000 Modulus Formulation (19.1 wt. %)

| | Resin/Isocyanate Weight Ratio | | |
|---|---|---|---|
| | 2.40 | 2.21 | 2.07 |
| Isocyanate equivalent | 0.95 | 1.03 | 1.1 |
| Specific gravity | 1.100 | 1.101 | 1.103 |
| Shore D hardness | 45 | 55 | 55 |
| Flexural Modulus (thousands) at + 75° F. psi | 13.6 | 25.8 | 27.2 |
| Heat Sag. 1 hr. at 250° F. (121° C.), in. | 0.4 | 0.1 | 0.3 |
| Coefficient of Linear Expansion −40° C.→+20° C. in/in × $10^5$/°C. | 13.4 | 13.5 | 15.1 |
| Ultimate Tensile Strength, psi | 2,550 | 2,920 | 2,650 |
| Tensile Modulus (100% elongation), psi | 1,280 | 1,470 | 1,440 |
| Elongation at break (percent) | 365 | 320 | 330 |
| Die "C" tear, pli | 356 | 358 | 389 |

EXAMPLES 10-12

The mini-RIM machine was operated three times using the commercial chain extender DETDA having 5%, 10%, and 25% of its chemical equivalent replaced with the reactive internal mold release agent and chain extender 4,6-diisopropyl-m-phenylenediamine.

In the run with 5% replacement by the reactive internal mold release agent, no external mold release agent was applied to the eight inch square mold. The first two plaques were readily demolded. Plaques 3-8 displayed a medium to strong adhesion progressively. After plaque 8, external mold release agent RIM-7 was applied and the next 17 plaques (9-25) demolded quite readily. Plaque 26 demolded poorly but plaques 27 and 28 demolded well. Plaques 29 and 30 demolded moderately well.

In the 10% replacement run, one application of external mold release agent was made. Plaques 1-30 demolded quite easily. Another application of external mold release was applied and plaques 31-43 demolded easily. In another run at the 10% replacement level, the first twelve eight inch square plaques demolded easily.

In the 25% replacement run, a single application of RIM-7 was sprayed on the mold and the first 18 plaques were readily demolded. It was found that for this low modulus formulation at the 25% replacement level, a mold temperature above 115° F. to below 145° F. was acceptable and 120°-130° F. was preferred with 120°-125° F. being more preferred. The most suitable mold temperature was found to vary depending upon the formulation but no mold temperature would noticeably improve demoldability without inclusion in the formulation of a reactive internal mold release agent of the invention. In a second run at the 25% replacement level, the first six, three inch by eight inch plaques and the next four, eight inch square plaques demolded easily.

Physical properties for the 10% and 25% replacement levels are shown in Tables 4 and 5, respectively. It can be seen that the good physical properties of the 100% DETDA run (Comparative Table 3) are not significantly affected by replacement with 10% or 25% reactive internal mold release agent.

TABLE 4

Physical properties Using 90% DETDA and 10% 4,6-diisopropyl-m-phenylenediamine In a 25,000 Modulus Formulation

|  | Resin/Isocyanate Weight Ratio 2.15 |
|---|---|
| Isocyanate equivalent | 1.05 |
| Specific gravity | 1.08 |
| Shore D hardness | 52 |
| Flexural Modulus (thousands) at + 75° F. psi | 28 |
| Heat Sag. 1 hr. at 250° F. (121° C.), in. | 0.3 |
| Coefficient of Linear Expansion −40° C.→+20° C. in/in × $10^5$/°C. | 13.6 |
| Ultimate Tensile Strength, psi | 2,280 |
| Tensile Modulus (100% elongation), psi | 1,270 |
| Elongation at break (percent) | 318 |
| Die "C" tear, pli | 348 |

TABLE 5

Physical properties Using 75% DETDA and 25% 4,6-diisopropyl-m-phenylenediamine In a 25,000 Modulus Formulation

|  | Resin/Isocyanate Weight Ratio 2.16 |
|---|---|
| Isocyanate equivalent | 1.03 |
| Specific gravity | 1.10 |
| Shore D hardness | 54 |
| Flexural Modulus (thousands) at + 75° F. psi | 26 |
| Heat Sag. 1 hr. at 250° F. (121° C.), in. | 0.1 |
| Coefficient of Linear Expansion −40° C.→+20° C. in/in × $10^5$/°C. | 18.1 |
| Ultimate Tensile Strength, psi | 3,240 |
| Tensile Modulus (100% elongation), psi | 1,730 |
| Elongation at break (percent) | 314 |
| Die "C" tear, pli | 412 |

EXAMPLE 13

The physical properties of a plaque made with 100% reactive internal mold release agent (4,6-diisopropyl-m-phenylenediamine) at 24.7 wt. % level and no other chain extender in a high modulus formulation are given in Table 6 below.

TABLE 6

Physical properties Using 4,6-diisopropyl-m-phenylenediamine In 50,000 Modulus Formulation

|  | Resin/Isocyanate Weight Ratio | | |
|---|---|---|---|
|  | 1.88 | 1.74 | 1.63 |
| Isocyanate equivalent | 0.95 | 1.03 | 1.10 |
| Specific gravity | 1.107 | 1.108 | 1.100 |
| Shore D hardness | 62 | 63 | 65 |
| Flexural Modulus (thousands) at + 75° F. psi | 55.6 | 52.3 | 52.8 |
| Heat Sag. 1 hr. at 250° F. (121° C.), in. | 0.08 | 0.21 | 0.17 |
| Coefficient of Linear Expansion −40° C.→+20° C. in/in × $10^5$/°C. | 16.5 | 17.4 | 15.7 |
| Ultimate Tensile Strength, psi | 3,300 | 3,570 | 3,620 |
| Tensile Modulus (100% elongation), psi | 2,270 | 2,350 | 2,500 |
| Elongation at break (percent) | 275 | 288 | 315 |
| Die "C" tear, pli | 579 | 568 | 610 |

EXAMPLES 14 AND 15

The mini-RIM machine was used to carry out runs wherein 10% and 20% of the chemical equivalent of the DETDA in a low modulus formulation were replaced by 4,6-diethyl-m-phenylenediamine (from Example 7).

The ethyl groups of this compound are somewhat less sterically hindering than the isopropyl groups of the previously used agent. Thus, the gel time is somewhat faster (about 1.5 seconds). The mold release feature was found to be not quite as effective as the isopropyl-substituted compound.

At the 10% replacement level, the first four plaques demolded very easily after application of a single coating of external mold release prior to the first injection. The fifth plaque demolded easily and the sixth fairly easily. The seventh and eighth plaques demolded easily although the mold was a bit difficult to open. Plaques 9-12 demolded easily. Plaques 13-16 were somewhat more difficult to demold and plaque 17 was of medium difficulty. Subsequent plaques were difficult to demold showing that this particular reactive internal mold release agent in this formulation was not as effective as its isopropyl homologue although still more effective than known chain extenders.

The 20% replacement level run was made after a very light application of external mold release agent. Plaques 1–4 had excellent demoldability. Plaques 5–14 had good demoldability and plaque 15 had poor demoldability.

While certain preferred compounds, processes, and products have been presented above as non-limiting examples, it is possible to vary the alkyl substituents and certain other aspects of the invention without departing from the scope or spirit thereof.

We claim:

1. A polyurethane formed from an organic polyol, an organic polyisocyanate, and a 4,6-dialkyl-m-phenylenediamine chain extender of structure:

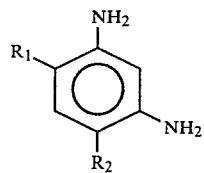

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl.

2. An article of manufacture formed from the polyurethane of claim 1.

3. A polyurethane of claim 1 wherein at least one of $R_1$ and $R_2$ has at least three carbon atoms.

4. A polyurethane of claim 1 wherein at least one of $R_1$ and $R_2$ has a secondary or tertiary carbon atom.

5. A polyurethane of claim 4 wherein at least one of $R_1$ and $R_2$ contains a secondary or tertiary carbon atom which is bonded to the aromatic nucleus.

6. A polyurethane of claim 1 wherein said chain extender is selected from the group consisting of 4,6-diisopropyl-m-phenylenediamine; 4,6-di-tert-butyl-m-phenylenediamine; 4,6-di-ethyl-m-phenylenediamine; 4,6-di-sec-butyl-m-phenylenediamine; and 4-isopropyl-6-methyl-m-phenylenediamine.

7. A polyurethane of claim 1 wherein said chain extender is 4,6-diisopropyl-m-phenylenediamine.

8. An active hydrogen-containing blend for use in the production of polyurethane moldings, said blend comprising:
(a) an organic polyol of molecular weight 400–7,000; and
(b) a 4,6-dialkyl-m-phenylenediamine chain extender miscible with said polyol and having the structure:

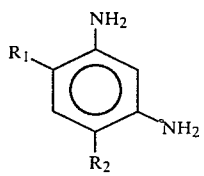

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl.

9. The blend of claim 8 and further comprising a catalyst for reaction between polyol and isocyanate groups.

10. The blend of claim 8 wherein said chain extender is selected from the group consisting of 4,6-diisopropyl-m-phenylenediamine; 4,6-di-tert-butyl-m-phenylenediamine; 4,6-diethyl-m-phenylenediamine; 4,6-di-sec-butyl-m-phenylenediamine; and 4-isopropyl-6-methyl-m-phenylenediamine.

11. The blend of claim 8 wherein said chain extender comprises 5 to 50 percent by weight of the polyol.

12. A process for preparing a RIM polyurethane molded product, said process comprising the steps of:
(a) at a temperature in the range of about 15°–100° C., subjecting to static impingement mixing at least two liquid streams, a first stream comprising
  (i) an organic polyol in the molecular weight range 400–7,000, and
  (ii) a 4,6-dialkyl-m-phenylenediamine chain extender of structure:

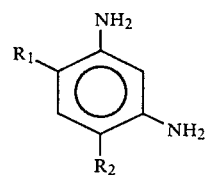

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl; and
a second stream comprising
  (iii) an organic polyisocyanate, or prepolymer or quasi-prepolymer formed from an organic polyisocyanate and an organic polyol,
at least one of said first stream and said second stream containing a catalyst, whereby a liquid mixture is produced;
(b) subsequently injecting a shot of said liquid mixture into a closed mold preheated to a temperature in the range about 15°–100° C.;
(c) opening the mold and removing the formed polyurethane molded product; and
(d) optionally subjecting said molded product to a post-cure at a temperature in the range about 50°–150° C., said process being conducted such that the amount of chain extender is about 5–30 weight percent of the total weight of components (i)–(iii).

13. The process of claim 12 wherein said chain extender is a dialkyl aromatic diamine selected from the group consisting of 4,6-diisopropyl-m-phenylenediamine; 4,6-di-tert-butyl-m-phenylenediamine; 4-isopropyl-6-methyl-m-phenylenediamine; 4,6-di-sec-butyl-m-phenylenediamine; and 4,6-diethyl-m-phenylenediamine.

14. A polyurethane elastomer prepared by reacting:
(a) one equivalent of an intermediate containing about 0.5–15.0 percent free—NCO groups prepared by reacting an organic polyisocyanate with an organic compound having at least two active hydrogen atoms as determined by the Zerewitinoff test with
(b) about 0.5–1.2 equivalents of 4,6-dialkyl-m-phenylenediamine chain extender of structure:

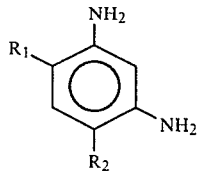

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl.

15. The process of claim 14 wherein said chain extender is a dialkyl diamine selected from the group consisting of 4,6-diisopropyl-m-phenylenediamine; 4,6-di-tert-butyl-m-phenylenediamine; 4-isopropyl-6-methyl-m-phenylenediamine; 4,6-di-sec-butyl-phenylenediamine; and 4,6-diethyl-m-phenylenediamine.

16. A process for applying a coating of elastomer polyurethane to a substrate, said process comprising the steps of:
(a) delivering to a mixing chamber an isocyanate-terminated prepolymer or quasi-prepolymer;
(b) also delivering to said mixing chamber a resin stream comprising an organic polyol and a curing agent comprising 4,6-dialkyl-m-phenylenediamine of structure:

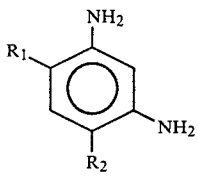

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl;
(c) if necessary for fluid transfer or intimate admixing, heating the components of (a) and (b) to about 130°–200° F.;
(d) intimately admixing said prepolymer or quasi-prepolymer with said resin stream; and
(e) spraying the admixture of (d) through an atomizing nozzle onto a substrate to form a polyurethane coating.

17. The process of claim 16 wherein a solvent is also admixed with the polyurethane-forming components.

18. A process for the successive preparation of polyurethane reaction injection molded articles without successive applications of external mold release agent, said process comprising:
(a) injecting into a closed mold
 (i) an organic polyisocyanate,
 (ii) an organic polyol,
 (iii) a catalyst, and
 (iv) a chain extender comprising at least about 5% by weight of an aromatic diamine reactive internal mold release agent of structure:

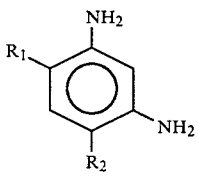

wherein $R_1$ is a $C_1$–$C_6$ alkyl or $C_3$–$C_6$-cycloalkyl and $R_2$ is a $C_2$–$C_6$ alkyl or $C_3$–$C_6$ cycloalkyl;

(b) removing the molded article from the mold upon solidification; and
(c) after an optional post-cure period, repeating steps (a) and (b) without application of an external mold release agent.

19. The process of claim 18 wherein said aromatic diamine is 4,6-diisopropyl-m-phenylenediamine or 4,6-di-sec-butyl-m-phenylenediamine.

20. The process of claim 19 wherein said aromatic diamine reactive internal mold release agent comprises 10–50% of said chain extender.

21. The process of claim 18 wherein said chain extender comprises 0–95% by weight methylenebis(2,6-diisopropylaniline); methylenebis(2,6-diethylaniline); 1-methyl-3,5-diethyl-2,4-diaminobenzene; 1-methyl-3,5-diethyl-2,6-diaminobenzene; or 1,3,5-triethyl-2,4-diaminobenzene.

22. The process of claim 21 wherein said chain extender comprises a mixture of 1-methyl-3,5-diethyl-2,4-diaminobenzene; and 1-methyl-3,5-diethyl-2,6-diaminobenzene.

23. The process of claim 22 wherein said reactive internal mold release agent is 4,6-diisopropyl-m-phenylenediamine.

24. The process of claim 18 wherein the closed mold of step (a) is maintained at about 115°–145° F.

25. The process of claim 24 wherein said mold is maintained at about 120°–130° F.

26. A reactive internal mold release composition comprising a first chain extender suitable for use in the formation of RIM or cast polyurethane elastomers and a 4,6-dialkyl-m-phenylenediamine chain extender different from said first chain extender and having the structure:

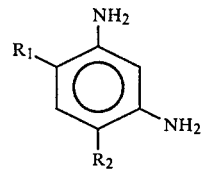

wherein $R_1$ is a $C_1$–$C_6$ alkyl or $C_3$–$C_6$ cycloalkyl and $R_2$ is a $C_2$–$C_6$ alkyl or $C_3$–$C_6$ cycloalkyl.

27. The composition of claim 26 wherein said first chain extender is 1-methyl-3,5-diethyl-2,4-diaminobenzene; 1-methyl-3,5-diethyl-2,6-diaminobenzene; or a mixture of said diaminobenzenes.

28. The composition of claim 26 wherein said 4,6-dialkyl-m-phenylenediamine is 4,6-diisopropyl-m-phenylenediamine.

29. The process of claim 27 wherein said 4,6-dialkyl-m-phenylenediamine is 4,6-diisopropyl-m-phenylenediamine.

30. The composition of claim 26 wherein said composition contains at least about one mole part 4,6-dialkyl-m-phenylenediamine per nine mole parts of said first chain extender.

31. The composition of claim 30 wherein said composition contains at least about one mole part 4,6-dialkyl-m-phenylenediamine per four mole parts of said first chain extender.

32. The composition of claim 31 wherein said 4,6-dialkyl-m-phenylenediamine is 4,6-diisopropyl-m-phenylenediamine and said first chain extender is 1-methyl-3,5-diethyl-2,4-diaminobenzene; 1-methyl-3,5-diethyl-2,6-diaminobenzene; or a mixture of said diaminobenzenes.

* * * * *

UNITED STATES PATENT AND TRADEMARK OFFICE
CERTIFICATE OF CORRECTION

PATENT NO. : 4,526,905
DATED : JULY 2, 1985
INVENTOR(S) : DONALD H. LUCAST, ET AL.

It is certified that error appears in the above-identified patent and that said Letters Patent is hereby corrected as shown below:

Column 9, line 1, reads "polyols" and should read -- glycols --.

Column 10, line 8, reads "There" and should read -- These --.

Column 15, line 46, reads "120°C" and should read -- 120°F --.

Signed and Sealed this

Twenty-second Day of October 1985

[SEAL]

Attest:

DONALD J. QUIGG

Attesting Officer

Commissioner of Patents and
Trademarks—Designate